April 2, 1963 W. M. GOYARTS 3,083,981
FRONT SUSPENSION SYSTEMS
Filed July 1, 1960 2 Sheets-Sheet 1
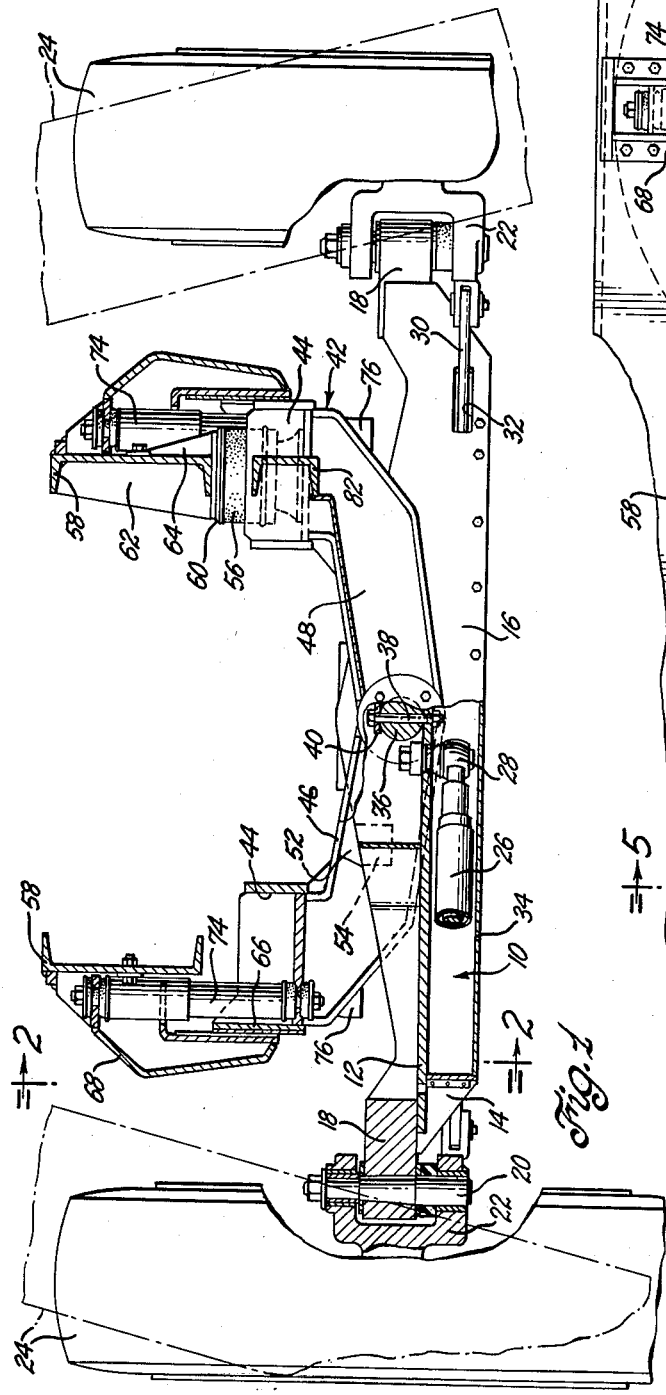
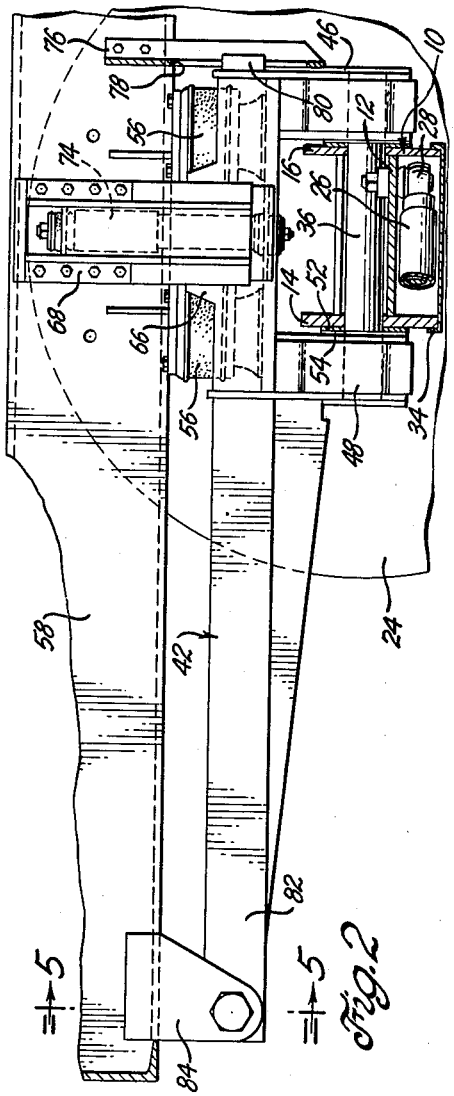
INVENTOR.
WYNAND M. GOYARTS
BY
Dale A. Winnie
ATTORNEY

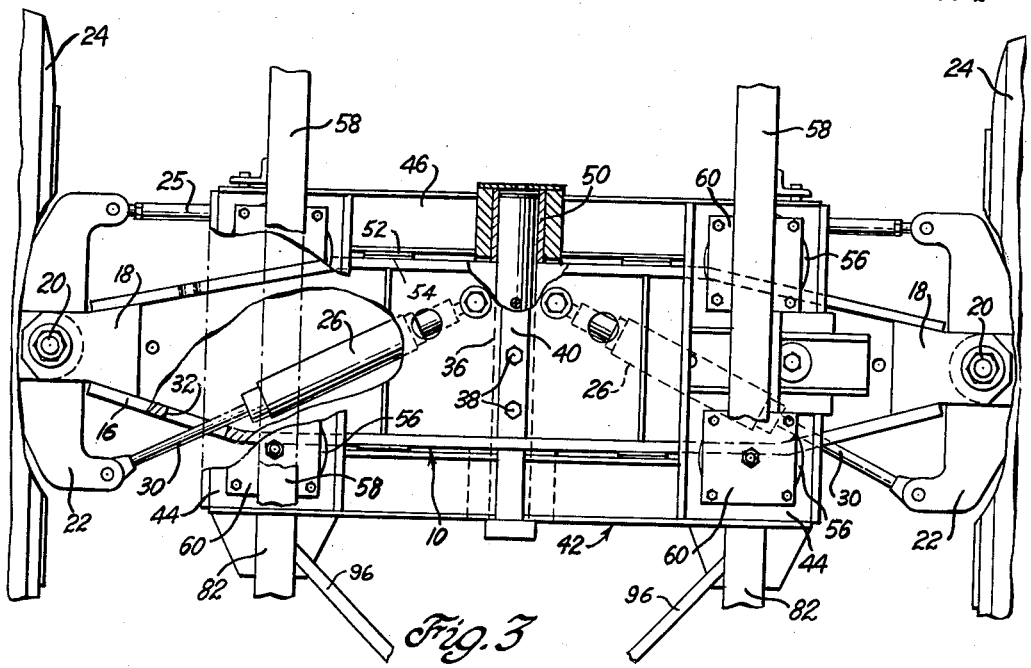
Fig. 3
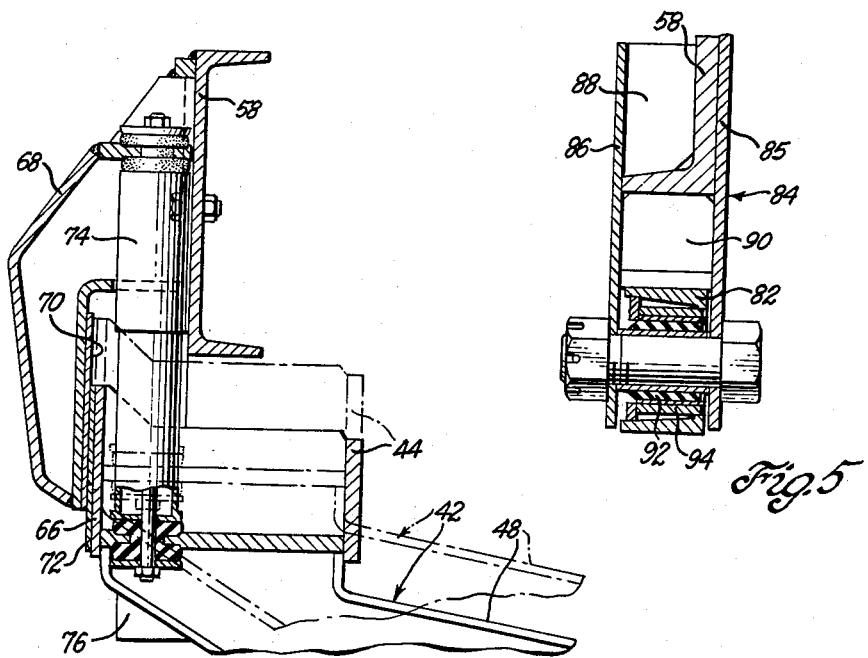
Fig. 4
Fig. 5
INVENTOR.
WYNAND M. GOYARTS
BY Dale A. Winnie
ATTORNEY

United States Patent Office 3,083,981
Patented Apr. 2, 1963

3,083,981
FRONT SUSPENSION SYSTEMS
Wynand M. Goyarts, South Bend, Ind., assignor to Curtiss-Wright Corporation, South Bend, Ind., a corporation of Delaware
Filed July 1, 1960, Ser. No. 40,422
6 Claims. (Cl. 280—112)

This invention relates to vehicle suspension systems in general and more particularly to front suspension systems for heavy-duty off-highway vehicles.

Generally speaking, off-highway vehicles have been using principally one of two different front suspension systems. One such system includes having the front axle suspended by means of two longitudinally disposed leaf springs and having the axle located in longitudinal and transverse directions by the springs or by locating rods. The other system requires suspending the front axle by means of a transversely disposed leaf spring and locating the axle in a longitudinal direction by means of an A frame and in a transverse direction by the leaf spring.

In the first mentioned suspension system, using longitudinally disposed leaf springs, a very rough ride is obtained since the front wheels have very little freedom to follow irregularities in the terrain over which the vehicle is required to travel. Furthermore, due to clearance problems between the front suspension assembly and the vehicle engine, a drop center axle is required in most instances with a resultant loss in ground clearance.

The transversely disposed leaf spring suspension system has the same clearance problem as regards the vehicle engine and also requires a drop center axle, in most instances, and therefore has the same short-coming as regards reduced ground clearance. Although this latter system affords more freedom of transverse axle oscillation, with the leaf spring pinned centrally to a frame cross member, the required stiffness of the spring results in poor riding characteristics.

It is an object of this invention to teach a front suspension system which is particularly adaptable for use with heavy-duty off-highway vehicles and provides an improved riding quality not heretofore obtained by other front suspension systems.

It is also an object of this invention to teach a suspension system which does not require torsion bars or like members and has improved transverse and longitudinal rigidity with the required degree of flexibility.

Another object of this invention is to teach a front suspension system which makes use of a straight axle beam while providing ample clearance between the suspension unit and the vehicle driving engine for any forseeable contingency.

A further object of this invention is to teach a front suspension system which affords an increase in the ground clearance under the suspension unit.

A still further object of this invention is to teach a suspension system of lighter construction and improved performance over previously known suspension systems used for like purposes.

These and other objects and advantages to be obtained in the practice of this invention will be more apparent upon a reading of the following specification, in regard to a preferred embodiment of the invention, in conjunction with the accompanying drawings.

In the drawings:

FIGURE 1 is a front view of the front suspension system with certain parts broken away and shown in section for better illustration thereof.

FIGURE 2 is a side view of the suspension system of FIGURE 1 as seen substantially in the plane of line 2—2 and looking in the direction of the arrows thereon.

FIGURE 3 is a top plan view of the suspension system with certain parts broken away to show other parts which are otherwise not readily visible.

FIGURE 4 is an enlarged view of the mounting means providing controlled vertical travel of the axle supporting part of the suspension system, as shown by FIGURE 1, and having the upper limits of vertical travel shown by phantom outline.

FIGURE 5 is an enlarged and cross-sectional view of a connecting part of the suspension system as seen in the plane of line 5—5 of FIGURE 2 and viewed in the direction of the arrows thereon.

The front suspension system of this invention, in brief, includes a straight axle beam which is pivotally connected to a walking beam that is in turn mounted to the vehicle frame by means of air springs. The walking beam is longitudinally restrained by trailing arms which are hinged to the vehicle frame and is transversely restrained and guided for vertical travel by guide brackets secured in depending relation from the vehicle frame. Accordingly, the axle beam is free to oscillate about the centrally located pivot of the walking beam, in a transverse direction, and is free for vertical oscillation as permitted by the air springs and dampened by shock absorbers connected between the vehicle frame and the walking beam.

Referring to the drawings in further detail:

The axle beam 10 comprises a flat plate 12 having side flanges 14 and 16 secured thereto to form a straight H-section axle beam. Mounting blocks 18 are provided on the ends of the axle beams to receive the king pin assemblies 20 which support the steering knuckles 22 of the wheels 24.

A tie rod 25 connects the steering knuckles 22 of the respective wheels 24 and power cylinders 26 are provided between the axle beam and the steering knuckles to afford steering control. The power cylinders are engaged to the axle beam 10 by horizontal ball stud assemblies 28 and the piston rods 30 thereof extend through suitably provided openings 32 in the axle beam flange 16. A cover plate 34 is provided on the underside of the axle beam and affords protection for the steering controls.

The axle beam flanges 14 and 16 extend sufficiently over the axle beam plate 12, centrally thereof, to receive the ends of a swivel shaft 36 therethrough. The shaft 36 is secured to the plate 12 by bolts 38 which extend through a cross-brace 40 to more securely retain the shaft in place. The ends of the shaft extend beyond the axle beam flanges and are engaged with the walking beam structure 42 of the suspension system.

The walking beam structure 42 includes a pair of longitudinally extended air spring pockets 44 which are laterally spaced and are joined together by cross arms 46 and 48 near their forward and rearwardly disposed ends, respectively. The arms 46 and 48 are box-sectioned members which depend below the level of the spring pockets 44 sufficiently to receive the axle beam 10 therebetween and to have the swivel shaft 36 engaged therewith. The ends of the swivel shaft 36 are received in suitable journal bearings 50 provided within the cross arms and centrally thereof. This arrangement results in the axle beam 10 being pivotally engaged to the walking beam 42 and having relative freedom of lateral oscillation except; as limited by suitably disposed stops (not shown).

Wear plates 52 and 54 are provided on the adjacently disposed sides of the axle beam 10 and walking beam 42 where engagement and wear would normally occur in the course of axle beam movement. Such plates also serve to take unequal side loading.

Within each of the air spring pockets 44 of the walking beam 42 is disposed a pair of air bag springs 56. Such air springs 56 are secured to the bottom wall of the spring pockets and to a frame rail 58 of the suspension supporting vehicle. The air bags actually include mounting pads 60 which are secured to the frame rails and are strengthened by webbed braces 62 and 64.

Intermediate each pair of air springs 56, in their respective pockets 44, the outer side wall of the spring pocket members is raised to form a guide wall 66. This guide wall is engaged by a guide bracket 68 that is secured to the vehicle frame members 58 and cooperates therewith to limit movement of the walking beam 42 to vertical travel. The guide bracket 68 is formed to extend outwardly from and below the frame rail to which it is secured to orient the walking beam 42 thereunder and has a wear plate 70 provided on the inner face of the depending part thereof. A cooperatively disposed wear plate 72 is provided on the outer side of the spring pocket wall 66.

The relative freedom of vertical movement afforded the walking beam 42 is restrained and softened by the air springs 56 and is dampened by shock absorbers 74. The shock absorbers are hydraulic units engaged to the frame rails 58, via the brackets 68, and to the bottom wall of the spring pockets 44 between the air springs and within the protection of the guide brackets 68. Vertical travel of the walking beam is further limited by a stop 76 depending from the frame rail. The stop 76 is slotted, as at 78, and receives a key 80, which is secured to the walking beam, therein.

The walking beam 42 is positioned longitudinally by trailing arms 82 which are engaged to the spring pockets 44 and form a part of the walking beam structure. The trailing arms 82 have their rearwardly extended ends hingedly engaged to brackets 84 depending from the vehicle frame rails 58. The brackets are shown by FIGURE 5 to include spaced sides 85 and 86 including strengthening gussets 88 and 90 therebetween and engaging the frame rail. The channel-sectioned trailing arm 82 is received between the sides of the bracket 84 and is supported on a rubber bushing 92. A suitable bushing seat 94 is provided for such purpose.

The trailing arms 82 are structurally interconnected by such as diagonal braces 96, shown in FIGURE 3, which are engaged between respectively opposite ends of the trailing members.

It will be appreciated that the movement of the walking beam 42 is principally vertical although it is actually an arcuate travel due to the trailing arm connection. It is the length of the trailing arms which causes the arcuate travel to be essentially vertical. The minor longitudinal movement incident to the trailing arm connection is easily permitted within the air springs 56 and presents no problem.

The disclosed suspension system thus comprises a walking beam structure 42 that is relatively free to move up and down and is restrained longitudinally by trailing arms 82. The vertical movement is cushioned by air springs 56, dampened by shock absorbers 74 and limited by stops 76. Lateral movement is restrained by guide brackets 68. At the same time, the axle beam 10, being pivotally engaged to the walking beam 42, has relative freedom of oscillatory movement about its pivotal connection and allows the vehicle wheels 24 to follow the irregularities of the terrain over which they travel without hindrance.

I claim:
1. A vehicle suspension system, comprising; an axle supporting member extended between laterally spaced vehicle frame members and including air spring receiving pockets near the ends thereof, air spring members provided in said receiving pockets and engaged thereto and to said frame members, guide means provided on said frame members and engaging the side walls of said pockets for lateral restraint of said supporting member, means hingedly connecting said supporting member to said frame members for longitudinal restraint thereof, and a wheel supporting member pivotally connected to said supporting member centrally thereof and having relative freedom of vertical oscillation about said pivotal connection.

2. A suspension system for heavy-duty off-highway vehicles, and comprising; an axle supporting member including laterally spaced suspension spring receiving pockets, longitudinally spaced arms interconnecting said spring pockets and depending below the general plane thereof, trailing arms hingedly connecting said supporting member to a vehicle frame at a location remote from said spring pockets, suspension spring members received in said spring pockets and engaged between said pockets and said vehicle frame, means provided on said vehicle frame and disposed in guiding engagement relative to said axle supporting member for restraining said supporting member to essentially vertical movement relative to said vehicle frame, and a relatively straight wheel supporting axle beam received between said spring pocket connecting arms and pivotally engaged thereto for relative freedom of vertical oscillation.

3. A vehicle suspension system, comprising: an axle supporting member disposed between laterally spaced vehicle frame members, air spring means provided on the ends of said axle supporting member and for engagement with said frame members, lateral guide means provided on said frame members and disposed to preclude lateral movement of said axle supporting member, trailing arm members engaged to said axle supporting member and pivotally engaged to said frame members at a spaced distance apart therefrom, said trailing arm members restraining longitudinal movement of said axle supporting member and in combination with said lateral guides limiting travel thereof to vertical oscillations about the pivotal connection of said arms to said frame members, a relatively straight beam axle member pivotally connected to said axle supporting member centrally thereof, bottoming stops provided on said axle supporting member and disposed for engagement by said axle member, and said axle member having relative freedom of vertical oscillation about the pivotal connection thereof to said supporting member uninhibited by other than said bottoming stops.

4. The vehicle suspension system of claim 3: said axle supporting member including a centrally open box-sectioned framework having depending cross rails and receiving said axle member in close fitting guided relation therebetween.

5. The vehicle suspension system of claim 4 having said bottoming stops provided on the side rails of said open box-sectioned framework in close proximity under said air spring means.

6. The vehicle suspension system of claim 4 including laterally spaced air spring means provided on the side rail ends of said open box-sectioned supporting member framework, and shock absorber means provided between said spaced air spring means and over said bottoming stops within the shielded protection of said lateral guide means.

References Cited in the file of this patent

UNITED STATES PATENTS

| | | |
|---|---|---|
| 1,144,513 | Waite | June 29, 1915 |
| 1,418,613 | Bement | June 6, 1922 |
| 1,499,675 | McDougal | July 1, 1924 |
| 1,915,303 | Forsyth | June 27, 1933 |
| 2,180,917 | Terrell | Nov. 21, 1939 |
| 2,553,746 | Camilly et al. | May 22, 1951 |
| 2,865,650 | Chalmers et al. | Dec. 23, 1958 |
| 2,903,256 | Weiss | Sept. 8, 1959 |
| 2,905,459 | Fiske | Sept. 22, 1959 |